US008046355B2

(12) United States Patent
Alfonseca et al.

(10) Patent No.: US 8,046,355 B2
(45) Date of Patent: Oct. 25, 2011

(54) WORD DECOMPOUNDER

(75) Inventors: Enrique Alfonseca, Horgen (CH); Stefan H. Pharies, Zürich (CH)

(73) Assignee: Google Inc., Mountain View, CA (US)

( * ) Notice: Subject to any disclaimer, the term of this patent is extended or adjusted under 35 U.S.C. 154(b) by 950 days.

(21) Appl. No.: 11/849,728

(22) Filed: Sep. 4, 2007

(65) Prior Publication Data

US 2009/0063462 A1 Mar. 5, 2009

(51) Int. Cl.
*G06F 17/30* (2006.01)
(52) U.S. Cl. .................................... 707/721; 707/759
(58) Field of Classification Search .................. 707/721, 707/759

See application file for complete search history.

(56) References Cited

U.S. PATENT DOCUMENTS

| | | | |
|---|---|---|---|
| 5,223,924 A * | 6/1993 | Strubbe | 725/46 |
| 6,349,282 B1 * | 2/2002 | Van Even et al. | 704/257 |
| 6,393,399 B1 | 5/2002 | Van Even | |
| 7,254,774 B2 | 8/2007 | Cucerzan et al. | |
| 7,577,643 B2 * | 8/2009 | Dominowska et al. | 1/1 |
| 2002/0194173 A1 * | 12/2002 | Bjornson et al. | 707/4 |
| 2003/0074353 A1 * | 4/2003 | Berkan et al. | 707/5 |
| 2003/0158725 A1 * | 8/2003 | Woods | 704/10 |
| 2004/0254920 A1 | 12/2004 | Brill et al. | |
| 2005/0033565 A1 | 2/2005 | Koehn | |
| 2005/0149514 A1 * | 7/2005 | Tsuzuki et al. | 707/3 |
| 2005/0197829 A1 * | 9/2005 | Okumura | 704/10 |
| 2005/0222998 A1 | 10/2005 | Driessen et al. | |
| 2005/0262050 A1 * | 11/2005 | Fagin et al. | 707/3 |
| 2006/0248076 A1 | 11/2006 | Troy et al. | |

OTHER PUBLICATIONS

Chan et al., Clustering Search Engine Query Log Containing Noisy Clickthroughs, Saint, IEEE Computer Society, 2004.*
Kürsten et al., Monolingual Retrieval Experiments with a Domain-Specific Document Corpus at the Chemnitz University of Technology, CLEF 2006.*
Chen et al., Multilingual Information Retrieval Using Machine Trarnslation, Relevance Feedback and Decompounding, Information Retrieval, 7, 149-182, 2004.*
Braschler et al., How Effective is Stemming and Decompounding for German Text Retrieval?, Information Retrieval, 7, 291-316, 2004.*
Martinez-Santiago et al., Sinai at CLEF 2003: Decompounding and Merging, CLEF 2003.*
Brown R. (1999), Adding Linguistic Knowledge to a Lexical Example-Based Translation System, in Proceedings of the Eighth International Conference on Theoretical and Methodological Issues in Machine Translation (TMI-99): pp. 22-32.
Koehn P. & Knight K. (2003), "Empirical Methods for Compound Splitting", in Proceedings of the tenth conference on European Association for the Computational Linguistics Morristown, NJ, USA pp. 187-193.

(Continued)

*Primary Examiner* — James Trujillo
*Assistant Examiner* — William Spieler
(74) *Attorney, Agent, or Firm* — Fish & Richardson P.C.

(57) ABSTRACT

A word is split into one or more first substrings. A morpheme is applied to the one or more first substrings to create one or more second substrings. The one or more first and second substrings are selected as one or more splittings, and a score is generated for each of the one or more splittings. One of the one or more splittings with a score higher than the other one or more splittings is selected as a keyword.

42 Claims, 8 Drawing Sheets

OTHER PUBLICATIONS

Larson M., Willett D., Köhler J. & Rigoll G. (2000), "Compound splitting and lexical unit recombination for improved performance of a speech recognition system for German parliamentary speeches", in Proceedings of the 6$^{th}$ International Conference on Spoken Language Processing (ICSLP).

Marek T. (2006), Analysis of German compounds Using Weighted Finite State Transducers, Technical report, BA Thesis, Universität Tübingen.

Monz C. & De Rijke M. (2001), "Shallow Morphological Anlysis in Monolingual Information Retrieval for Dutch, German, and Italian", in Evaluation of Cross-Language Information Retrieval Systems, CLEF, vol. 2406, Springer, pp. 262-277, 2002.

Schiller A. (2005), "German Compound Analysis with wfsc", in Proceedings of Finite State Methods and Natural Language Processing 2005, Helsinki, pp. 239-246, 2006.

* cited by examiner

WORD DECOMPOUNDER

BACKGROUND

This disclosure relates to information retrieval.

Content items, e.g., advertisements, can be identified by a search engine in response to a query. The query can include one or more search terms, and a search engine can identify and rank the content items based on, for example, the search terms, e.g., keywords, in the query and one or more parameters associated with the content item.

Some online advertising systems are used in countries where the language includes compound words. A compound word includes two or more words merged together. For example, in German, the word for "flower bouquet" is the compound word "Blumenstraeusse" made up of Blumen (flower) and Straeusse (bouquet). Online advertising systems can be used in countries such as Germany where the language, German, includes compound words. Therefore, the search terms used in these queries can include these compound words.

Determining the appropriate advertisements to be displayed when a query is performed with search terms that are compound words can result in higher advertising revenue and a better user experience. Some advertising systems identify advertisements using the entire compound word as a keyword. However, other processes can be used to select advertisements associated with these compound words.

SUMMARY

Disclosed herein are systems, methods and computer program products for splitting a word into one or more substrings. In one implementation, a substring of a word is identified and a determination is made as to whether the substring appears in a query log. A score is generated for the substring based on the determination that the substring appears in a query log and one or more properties associated with the substring. The substring is selected as a keyword.

In another implementation, one or more first substrings of a word are identified. A first morpheme is added to the one or more first substrings to create one or more second substrings, and a second morpheme is removed from the one or more first substrings to create one or more third substrings. One or more of the one or more first, second, and third substrings are selected as one or more splittings of the word, and a determination is made as to whether the one or more first, second, or third substrings appear in a query log. A score is generated for each of the one or more splittings based on a determination that the one or more first, second, or third substrings appear in the query log and one or more properties associated with each of the one or more first, second, and third substrings that are selected as part of each of the one or more splittings. A splitting selected from among the one or more splittings with a score higher than the other one or more splittings is selected as a keyword.

In another implementation, a word is split into one or more first substrings. A morpheme is applied to the one or more first substrings to create one or more second substrings. A determination is made as to whether the one or more first, second, or third substrings appear in a query log, and one or more of the one or more first, second, and third substrings are selected as one or more splittings of the word. A score is generated for each of the one or more splittings based on a determination that the one or more first, second, or third substrings appear in the query log and one or more properties associated with each of the one or more first, second, and third substrings. A splitting selected from among the one or more splittings is selected based on the score.

In another implementation, a system includes a splitting engine that splits a word into one or more first substrings, applies a morpheme to the one or more first substrings to create one or more second and one or more third substrings, determines whether the one or more first, second, or third substrings appear in a query log, and selects one or more of the one or more first, second, and third substrings as one or more splittings of the word. The system also includes a scoring engine that generates a score for each of the one or more splittings based on a determination that the one or more first, second, or third substrings appear in the query log and one or more properties associated with each of the one or more first, second, and third substrings, and selects a splitting selected from among the one or more splittings based on the score.

DETAILED DESCRIPTION

Figure 1:
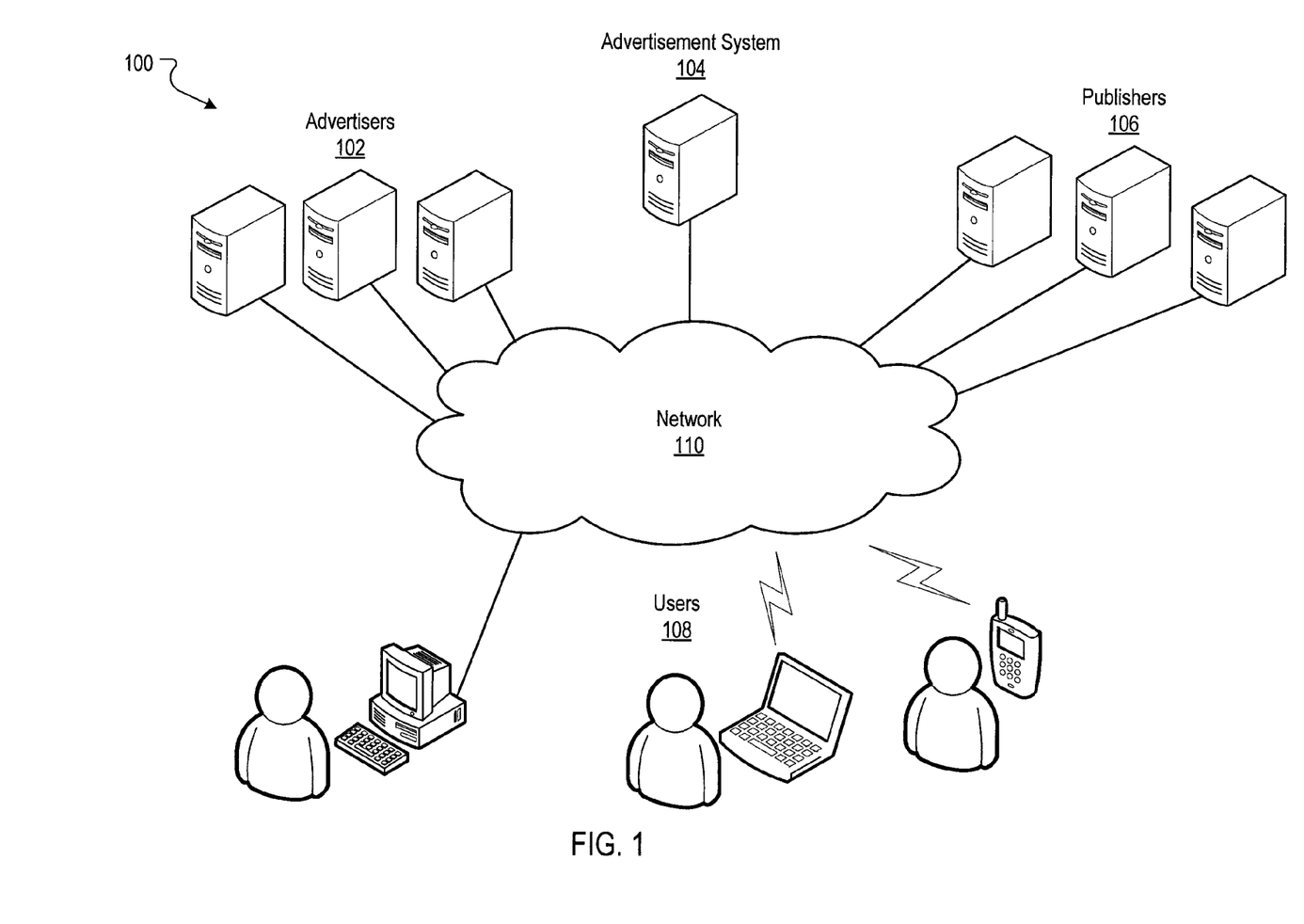
FIG. 1 is a block diagram of an example implementation of an online advertising system.

FIG. 1 is a block diagram of an example implementation of an online advertising system 100. In some implementations, one or more advertisers 102 can directly, or indirectly, enter, maintain, and track advertisement ("ad") information in an advertisement system 104. The advertisements may be in the form of graphical advertisements, such as banner advertisements, text only advertisements, image advertisements, audio advertisements, video advertisements, advertisements combining one of more of any of such components, etc. The advertisements may also include embedded information, such as a links, meta-information, and/or machine executable instructions. One or more publishers 106 may submit requests for advertisements to the system 104. The system 104 responds by sending advertisements (e.g., when an associated publication is rendered) to the requesting publisher 106 (or a browser associated with a requesting user) for placement/co-location on one or more of the publisher's rendered web properties (e.g., websites and other network-distributed content). While reference is made to advertisements, other content items can be provided by the system 104.

Other entities, such as users 108 and the advertisers 102, can provide usage information to the system 104, such as, for example, whether or not a conversion or click-through related to an advertisement has occurred. A click-through can occur, for example, when a user of a user device, selects or "clicks" on an advertisement. The click-through rate can be a performance metric that is obtained by dividing the number of users that clicked on the advertisement or a link associated with the advertisement by the number of times the advertisement was delivered. A "conversion" occurs when a user, for example, consummates a transaction related to a previously served advertisement. What constitutes a conversion may vary from case to case and can be determined in a variety of ways.

This usage information can include measured or observed user behavior related to advertisements that have been served. The system 104 performs financial transactions, such as crediting the publishers 106 and charging the advertisers 102 based on the usage information.

A computer network 110, such as a local area network (LAN), wide area network (WAN), the Internet, or a combination thereof, connects the advertisers 102, the system 104, the publishers 106, and the users 108.

One example of a publisher 106 is a general content server that receives requests for content (e.g., articles, discussion threads, music, video, graphics, search results, web page listings, information feeds, etc.), and retrieves the requested content in response to the request. The content server may submit a request for advertisements to an advertisement server in the system 104. The advertisement request may include a number of advertisements desired. The advertisement request may also include content request information. This information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, the content server can combine the requested content with one or more of the advertisements provided by the system 104. This combined content and advertisements can be sent to the user 108 that requested the content for presentation in a viewer (e.g., a browser or other content display system). The content server can transmit information about the advertisements back to the advertisement server, including information describing how, when, and/or where the advertisements are to be rendered (e.g., in HTML or JavaScript™).

Another example publisher 106 is a search service. A search service can receive queries for search results. In response, the search service can retrieve relevant search results from an index of documents (e.g., from an index of web pages). An exemplary search service is described in the article S. Brin and L. Page, "The Anatomy of a Large-Scale Hypertextual Search Engine," Seventh International World Wide Web Conference, Brisbane, Australia and in U.S. Pat. No. 6,285,999, both of which are incorporated herein by reference each in their entirety. Search results can include, for example, lists of web page titles, snippets of text extracted from those web pages, and hypertext links to those web pages, and may be grouped into a predetermined number of (e.g., ten) search results.

The search service can submit a request for advertisements to the system 104. The request may include a number of advertisements desired. This number may depend on the search results, the amount of screen or page space occupied by the search results, the size and shape of the advertisements, etc. In some implementations, the number of desired advertisements will be from one to ten, or from three to five. The request for advertisements may also include the query (as entered or parsed), information based on the query (such as geo-location information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

The search service can combine the search results with one or more of the advertisements provided by the system 104. This combined information can then be forwarded to the user 108 that requested the content. The search results can be maintained as distinct from the advertisements, so as not to confuse the user between paid advertisements and presumably neutral search results. Finally, the search service can transmit information about the advertisement and when, where, and/or how the advertisement was to be rendered back to the system 104.

As can be appreciated from the foregoing, the advertising management system 104 can serve publishers 106, such as content servers and search services. The system 104 permits serving of advertisements targeted to content (e.g., documents) served by content servers or in response to search queries provided by users. For example, a network or inter-network may include an advertisement server serving targeted advertisements in response to requests from a search service with advertisement spots for sale. Suppose that the inter-network is the World Wide Web. The search service crawls much or all of the content. Some of this content will include advertisement spots (also referred to as "inventory") available. More specifically, one or more content servers may include one or more documents. Documents may include web pages, email, content, embedded information (e.g., embedded media), meta-information and machine executable instructions, and advertisement spots available. The advertisements inserted into advertisement spots in a document can vary each time the document is served or, alternatively, can have a static association with a given document.

In one implementation, the requests that the general content servers receive and the queries the search services receive may be in languages that use compound words. Therefore, the terms in the requests and the queries can include compound words. For example, the Germanic languages Afrikaans, Danish, Dutch-Flemish, English, Faroese, Frisian, High German, Gutnish, Icelandic, Low German, Norwegian, Swedish, and Yiddish all include compound words to some extent. The compound words can be created by merging simpler words together. For example, the German word "Blumenstraeusse" (flower bouquet) is made up of Blumen (flower) and Straeusse (bouquet).

In some implementations, to create a wider coverage for advertisements, the advertisement system 104 can decompose the compound words into splittings, or substrings, and select one or more of the decomposed words, or substrings, as keywords to search for advertisements.

Figure 2:
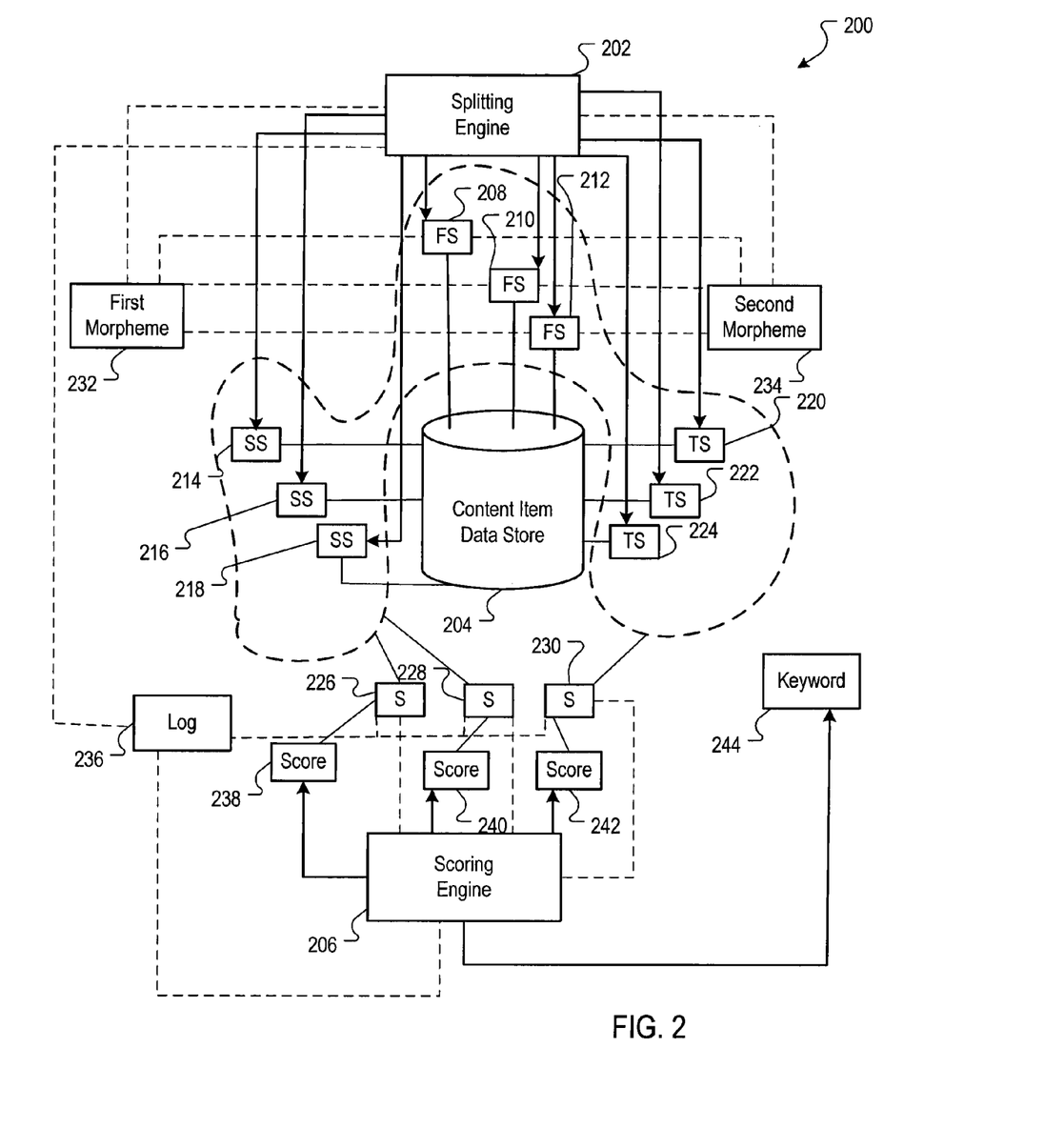
FIG. 2 is a block diagram of an example word splitting system.

FIG. 2 is a block diagram of an example word splitting system 200. The word splitting system 200 can, for example, be implemented in a computer device or one or more computer devices connected through a network, e.g., a local area network (LAN) or a wide area network (WAN), such as the Internet. The word splitting system 200 can, for example be implemented in the advertisement system 104, which can be implemented in a computing system. The one or more computing devices can, for example, include memory devices storing processing instructions and processing devices for executing the processing instructions. An example computing system is shown and described with reference to FIG. 8. Other implementations, however, can also be used.

In addition to splitting a compound word into one or more substrings, the word splitting system 200 can assign a score to each substring and select one or more of the substrings as a keyword. The score can be calculated based on parameters associated with each substring. In one implementation, the highest scoring substring can be selected as the keyword to use in selecting advertisements.

The word splitting system 200 can, for example, include a splitting engine 202, a data store 204, and a scoring engine 206. In one implementation, the data store 204 can comprise a unitary data store, such as a hard drive. In another implementation, the data store 204 can comprise a distributed data store, such as a storage system that is distributed over a network. Other implementations, however, can also be used.

In one implementation, the data store 204 can store one or more words, e.g., compound words, and one or more content items, e.g., advertisements. Each word in the data store 204 can be associated with one or more first substrings 208, 210, 212, one or more second substrings 214, 216, 218, and one or more third substrings 220, 222, 224. The one or more first substrings 208, 210, 212, one or more second substrings 214, 216, 218, and one or more third substrings 220, 222, 224 can be identified by the splitting engine 202, as will be described further below. The one or more first substrings 208, 210, 212, one or more second substrings 214, 216, 218, and one or more third substrings 220, 222, 224 all combine to form the one or more word splittings 226, 228, and 230.

In one implementation, the splitting engine 202 can identify one or more first substrings 208, 210, 212 of a word. The word can, for example, be a compound word that includes one or more simpler words merged together. In order to identify the one or more first substrings 208, 210, 212, the splitting engine 202 can identify possible ways of splitting the word into the one or more first substrings 208, 210, 212. Each of the first substrings 208, 210, 212 can include one or more consecutive letters of the word. The consecutive letters can, for example, be located in any part of the word. For example, suppose the German compound word "kontrollfunktion" is used in a query. The splitting engine 202 can split the word into the following first substrings (hereinafter "exemplary first substrings"):

"k," "ko," "kon," "kont," "kontr," "kontro," "kontrol," "kontroll," "kontrollf," "kontrollfu," "kontrollfun," "kontrollfunk," "kontrollfunkt," "kontrollfunkti," "kontrollfunktio," "kontrollfunktion," "o," "on," "ont," "ontr," "ontro," "ontrol," "ontroll," "ontrollf," "ontrollfu," "ontrollfun," "ontrollfunk," "ontrollfunkt," "ontrollfunkti," "ontrollfunktio," "ontrollfunktion," "n", "nt," "ntr," "ntro," "ntrol," "ntroll," "ntrollf," "ntrollfu," "ntrollfun," "ntrollfunk," "ntrollfunkt," "ntrollfunkti," "ntrollfunktio," "ntrollfunktion," "t," "tr," "tro," "trol," "troll," "trollf," "trollfu," "trollfun," "trollfunk," "trollfunkt," "trollfunkti," "trollfunktio," "trollfunktion," "r," "ro," "rol," "roll," "rollf," "rollfu," "rollfun," "rollfunk," "rollfunkt," "rollfunkti," "rollfunktio," "rollfunktion," "o," "ol," "oll," "ollf," "ollfu," "ollfun," "ollfunk," "ollfunkt," "ollfunkti," "ollfunktio," "ollfunktion," "l," "ll," "llf," "llfu," "llfun," "llfunk," "llfunkt," "llfunkti," "llfunktio," "llfunktion," "f," "fu," "fun," "funk," "funkt," "funkti," "funktio," "funktion," "u," "un," "unk," "unkt," "unkti," "unktio," "unktion," "n," "nk," "nkt," "nkti," "nktio," "nktion," "k," "kt," "kti," "ktio," "ktion," "t," "ti," "tio," "tion," "i," "io," "ion," "on" and "n." In one implementation, a minimum length can be set to the length of the first substring, for example only considering those with at least three letters.

In one implementation, the splitting engine 202 can add a first morpheme 232 to the one or more first substrings 208, 210, 212 to create one or more second substrings 214, 216, 218. The splitting engine 202 can also, for example, remove a second morpheme 234 from the one or more first substrings 208, 210, 212 to create one or more third substrings 220, 222, 224. A morpheme is the smallest meaningful unit in the grammar of a language. A morpheme can include one or more letters.

In one implementation, the first morpheme 232 and the second morpheme 234 include Germanic language morphemes. The Germanic languages, as described above, include Afrikaans, Danish, Dutch-Flemish, English, Faroese, Frisian, High German, Gutnish, Icelandic, Low German, Norwegian, Swedish, and Yiddish. Each of these languages can include one or more morphemes. For example, in Dutch, "e" and "s" are morphemes. In German, "e", "en", "nen", "s", "ens", "es", "ns" or "er" are morphemes. The other Germanic languages also include morphemes that consist of one or more letters, as can be appreciated by one skilled in the art. In one implementation, the first morpheme 232 and the second morpheme 234 can include morphemes from other compound languages that may not be Germanic, for example, Finnish.

In one implementation, the splitting engine 202 can add a first morpheme 232 to the beginning and end of each of the one or more first substrings 208, 210, 212 to create the one or more second substrings 214, 216, 218. For example, for the German word "kontrollfunktion," the splitting engine 202 can add any of the German morphemes "e", "en", "nen", "s", "ens", "es", "ns" and "er" to the exemplary first substrings.

In one implementation, the splitting engine 202 can remove the second morpheme 234 from the beginning or end of each of the one or more first substrings 208, 210, 212 to create the one or more third substrings 220, 222, 224. For example, for the German word "kontrollfunktion," the splitting engine 202 can remove any of the German morphemes "e", "en", "nen", "s", "ens", "es", "ns" and "er" to any of the exemplary first substrings if the substring ends in any of those.

In one implementation, the splitting engine 202 can select one or more of the one or more first substrings 208, 210, 212, the one or more second substrings 214, 216, 218, and the one or more third substrings 220, 222, and 224 as the one or more word splittings 226, 228, 230 of the word. The splitting engine 202 can, for example, select any of the first, second, or third substrings 208, 210, 212, 214, 216, 218, 220, 222, and 224 as the one or more splittings 226, 228, 230 by determining which of the substrings 208, 210, 212, 214, 216, 218, 220, 222, and 224 together combine to form the closest version of the original word. The closest version can, for example, be determined by the character count of the word. The one or more splittings 226, 228, 230 can, for example, have the same number of characters as the original word. In one implementation, the one or more splittings 226, 228, 230 can have a predetermined number of characters greater or less than the original word. For example, for the word "kontrollfunktion," the splitting engine 202 can select "kontroll funktion" as one of the splittings 226, 228, 230. In this example, the number of characters of "kontrollfunktion," e.g., 16, equals the number of characters of "kontroll funktion," e.g., 16.

In one implementation, the splitting engine 202 can determine whether the one or more first, second, or third substrings 208, 210, 212, 214, 216, 218, 220, 222, and 224 appear in a log 236. The log can, for example, include a query log that includes keywords of previously submitted queries publishers 106 such as search services received in the advertisement system 104. The query log can also include previous keywords used in the requests that publishers 106, such as the general content servers, received in the advertisement system 104. The splitting engine 202 can determine whether the one or more first, second, or third substrings 208, 210, 212, 214, 216, 218, 220, 222, and 224 have been used before as keywords by searching for the substrings in the log 236.

For example, suppose the splitting engine 202 added the morphemes "e", "en", "nen", "s", "ens", "es", "ns" and "er" to each of the first substrings 208, 210, 212 of the word "kontrollfunktion" to create the one or more second substrings 214, 216, 218, as well as removed the morphemes "e", "en", "nen", "s", "ens", "es", "ns" and "er" from each of the first substrings 208, 210, 212 to create one or more third substrings 220, 222, 224. Suppose that the splitting engine 202 then determined that the second substring "kontrolle," which is the first substring "kontroll" with the morpheme "e" added, appears in the log 236. Therefore the second substring "kontrolle" was used previously as a keyword. Suppose also that the splitting engine 202 also determined that the first substrings "funktion," "funkt," and "ion" also appeared in the log 236. Therefore, the first substrings "funktion," "funkt," and "ion" were also previously used as keywords. In one implementation, the splitting engine 202 can combine the second substring "kontrolle," as well as the first substrings "funktion," "funkt," and "ion" to generate the splittings "kontroll funktion", "kontrolle function", "kontroll funkt ion" and "kontrolle funkt ion" as the one or more word splittings 226, 228, 230.

In one implementation, the scoring engine 206 can generate a score 238, 240, 242 for each of the one or more word splittings 226, 228, 230. The scoring engine 206 can generate the score 238, 240, 242 based on the determination that the one or more first, second, or third substrings 208, 210, 212, 214, 216, 218, 220, 222, and 224 appear in the query log 236 and also based on one or more properties associated with each of the one or more first, second, and third substrings 208, 210, 212, 214, 216, 218, 220, 222, and 224 that are selected as part of each of the one or more splittings 226, 228, 230. If any of the substrings in a word splittings 226, 228, 230 appear in the query log 236, the scoring engine 206 can then calculate the score 238, 240, 242 based on one or more parameters associated with each of the substrings in the word splittings 226, 228, 230. For example, suppose the splitting engine 202 selected "kontroll funktion" as a splitting. If both of the substrings "kontroll" and "funktion" are in the query log 236, then the scoring engine 206 can calculate a score for the splitting.

In one implementation, the frequency of each substring as a keyword can be one of one or more parameters associated with each substring in the word splittings 226, 228, 230. For example, the splitting engine 202 can measure the frequency of the substring "kontrolle" as a keyword in the log 236 by determining how often the substring "kontrolle" appears in the log 236.

In one implementation, the probability that a substring appears as a keyword can be one of the parameters associated with each substring in the word splittings 226, 228, 230. The probability can, for example, be calculated by taking the frequency of each substring appearing as a keyword in the query log 236 and dividing by the total frequency. For example, if the frequency of the substring "kontrolle" is 20, and the total frequency of all the keywords is 100, then the probability that the substring "kontrolle" appears as a query keyword is 20%.

In one implementation, the co-occurrence frequency of every possible substring pair in the same query can be one of the parameters associated with each substring in the word splittings 226, 228, 230. For example, the splitting engine 202 can measure the number of times that "kontrolle" appears in a query, the number of times that "funktion" appears in a query and the number of times that "kontrolle" and "funktion" appear in the same query. Suppose for example, the queries in the log 236 show the following substrings appeared with the following frequency:

kontrolle (frequency 2)
funktion (frequency 1)
funkt (frequency 4)
ion (frequency 1)
kontrolle funktion (frequency 2)
kontrolle funkt ion (frequency 2).

The frequencies can be calculated as: "kontrolle": 6 (this substring appeared in 6 queries) "funktion": 5 (this substring appeared in 5 queries), "funkt": 4 (this substring appeared in 4 queries), "kontrolle funktion": 4 (the substring pair appeared in the same query 4 times), "funktion ion": 2 (this substring pair appeared in the same query 2 times), and "kontrolle ion": 2 (this substring pair appeared in the same query 2 times).

In one implementation, the co-occurrence frequency of every possible substring pair, in the same query and in consecutive positions, can be one of the parameters associated with each substring in the word splittings 226, 228, 230. The splitting engine 202 can, for example, measure the number of times that both substrings are consecutive in a query in the log 236. With the previous example, the substring pairs and frequencies are: kontrolle funktion: 4 (2 in "kontrolle funktion", 2 in "kontrolle funktion ion")

In one implementation, the mutual information of each substring pair can be one of the parameters associated with each substring in the word splittings 226, 228, 230. The mutual information can be estimated from the substring frequencies and their co-occurrence frequencies. The mutual information, or transinformation, of two random variables e.g., substring frequencies and their co-occurrence frequencies, is a quantity that measures the mutual dependence of the two variables. The mutual information of two random variables can be calculated as follows:

$$I(X;Y) = \sum_{y \in Y} \sum_{x \in X} p(x,y) \log\left(\frac{p(x,y)}{p(x)p(y)}\right),$$

Where p(x) is the frequency of substring "x" in the query logs divided by the sum of the frequencies of all substrings. The probability p(x,y) is the frequency of substrings "x" and "y" co-occurring in the same query divided by the sum of frequencies of occurrences of every possible pair of substrings.

In one implementation, the probabilities of each substring can be one of the parameters associated with each substring in the word splittings 226, 228, 230. The probability of each substring is the frequency that the substring appears in the log 236 divided by the total number of substrings in the search queries in the log 236. If, for example, a substring "w" appears 20 times in the queries in the log 236, and a total of 1000 substrings exist in the queries in the log 236, the probability of "w" is 20/1000=0.02.

In one implementation, the co-occurrence frequencies of a compound word and the decompounded form of that word in anchor texts from hyperlinks pointing to a same web document can be parameters associated with each substring in the word splittings 226, 228, 230. Anchor text is the text that appears in a hyperlink on the web. If, for example, two web pages have a hyperlink to the same document, then the texts in those hyperlinks can be related, because the anchor texts usually describes the place where a user is directed if the user clicks on the link. Therefore, if the anchor text of a hyperlink to a web page contains the substring "kontrollfunktion," and in the anchor text of a hyperlink to the same web page exists "kontrolle funktion," then a good indication exists that all substrings, e.g., "kontrollfunktion," and "kontrolle funktion" are the same, written as a compound or separately.

In one implementation, the frequency of each substring as an advertiser keyword can be one of the parameters associated with each substring in the word splittings 226, 228, 230. The splitting engine 202 can, for example, measure the number of times each substring was previously used as a keyword by searching the log 236.

In one implementation, the co-occurrence frequencies of substrings as the same advertiser keyword, the co-occurrence frequencies of substrings in different keywords from the same advertisement, and the co-occurrence of a compound word and the decompounded form of that word (with blank spaces between the parts) as different keywords for the same advertisement can be parameters associated with each substring in the word splittings 226, 228, 230. For example, in the advertisement system 104, advertisers can bid on particular keywords for their advertisements to be shown. Therefore, an advertiser may bid on keywords such as "kontrolle," "funkt," or "funktion." If a word "kontrollfunktion" exists that can be decomposed in two parts, or substrings, "kontrolle" and "funktion," and many advertisers that bid on "kontrolle" are also bidding on "funktion," or on both, that is also an indication that "kontrollfunktion" is probably a compound word and "kontrolle funktion" is the correct way to split it.

Therefore, given a word w="kontrollfunktion," and the possible split w1+w2="kontrolle"+"funktion," the scoring engine 206 can determine the percentage of times that w1 and w2 appear together in the same keyword or campaign (of any advertisers), indicating that w1 and w2 exist as substrings and their meanings are related. A campaign, as defined herein, is a list of all keywords selected by an advertiser for one or more advertisements associated with the advertiser. The scoring engine 206 can evaluate and look for advertisers having an advertisement campaign that is targeted both for "kontrolle" and for "funktion."

In one implementation, the scoring engine 206 can determine the percentage of advertisers that bid for w and w1 as different keywords in the same campaign, the percentage of advertisers that bid for w and w2 as different keywords in the same campaign, and the percentage of advertisers that bid for w, w1 and w2 as different keywords in the same campaign. In one implementation, these three metrics indicate that w is probably a compound, and either w1, w2, or both can replace the compound word as keywords in an ad campaign, so they are probably related to each other.

Suppose, for example, advertisers are bidding both for "kontrollfunktion" and "kontrolle funktion." The scoring engine 206 can evaluate the percentage of advertisers that bid on "kontrollfunktion" and "kontrolle funktion" as different keywords in the same campaign, e.g., the compound and the phrase containing both words separately. Here, the scoring engine 206 would evaluate advertisers bidding on "kontrollfunktion" and "kontrolle funktion."

In one implementation, the scoring engine 206 can apply a machine learning algorithm to the parameters of each substring in the word splitting to calculate a score 238, 240, 242 for each word splitting 226, 228, 230. The scoring engine 206 can determine which word splitting 226, 228, 230 is the word splitting that would yield the highest score. The machine learning algorithm can, for example, be a support vector machine as described in J. Platt, *Fast Training of Support Vector Machines using Sequential Minimal Optimization*, in Advances in Kernel Methods—Support Vector Learning, B. Schölkopf, C. Burges, and A. Smola, eds., MIT Press (1998). The support vector machine can use any of the one or more parameters described above to calculate the scores 238, 240, 242, and determine which one of the one or more word splittings 226, 228, 230 is the splitting with the highest score.

The support vector machine can, for example, train on a model built from previous data. The model can includes previous words as well as whether these words are compounds or not and, in the case that they are compounds, how the words should be decompounded, or split into substrings. Therefore, for each of these words, any possible way of splitting the words into substrings has been indicated, and for each possible substring of each word, all the above parameters have been calculated, and the correct substring, e.g., the substring with the highest score, has been indicated.

Using the support vector machine that has been trained with the model described above, when the splitting engine 202 receives a word, the splitting engine 202 can generate every possible way of splitting this word into substrings as described above, and apply the support vector machine to score the substrings, and score the splittings. The scoring engine 206 can then select one of the one or more word splittings 226, 228, 230 with the highest score as calculated by the support vector machine.

In one implementation, the scoring engine 206 can rank the one or more word splittings 226, 228, 230 based on the scores 238, 240, 242. For example, the scoring engine 206 can rank the word splittings 226, 228, 230 by decreasing score. In another implementation, one or more of these parameters can be directly applied to rank the substrings without calculating a score for the substrings. For example, the mutual information metric, the geometric mean of the frequencies of the compound parts, or a product of the probabilities of the compound parts are all functions that can be used to rank the word splittings 226, 228, 230.

In one implementation, outside sources can be considered in determining whether the splitting engine 202 should split a compound word. For example, outside sources such as dictionaries from several languages, lists and gazetteers of locations, proper nouns of people (first names and family names), organizations, trademarks, and suffixes of the words can be considered by the splitting engine 202. These outside sources can contain words that the splitting engine 202 may not want split. For example, German words ending by "strasse" or "dorf" are usually place names and should be considered as proper nouns and not decompounded or split into substrings.

In one implementation, the substring selected from the one or more word splittings 226, 228, 230 with the highest score 238, 240, 242 can be selected as a keyword 244. The scoring engine 206 can select one or more advertisements associated with the keyword 244. For example, suppose the scoring engine 206 uses the support vector machine and determines the scores for the one or more word splittings 226, 228, 230 "kontrolle funktion," "kontroll funktion" "kontrolle funkt ion," and "kontroll funkt ion" are 50, 40, 30, and 20, respectively. The scoring engine 206 can select the highest scoring substring "kontrolle funktion," with the high score of 50, as the keyword to use in selecting advertisements. Therefore, even though the initial word used in the query was "kontrollfunktion," the splitting engine 202 split the word into substrings, and scoring engine 206 selected the highest scoring splitting "kontrolle function" as the keyword. The scoring engine 206 can select one or more advertisements associated with the keywords "kontrolle" and "function" in response to a search query using the word "kontrollfunktion."

Figure 3:
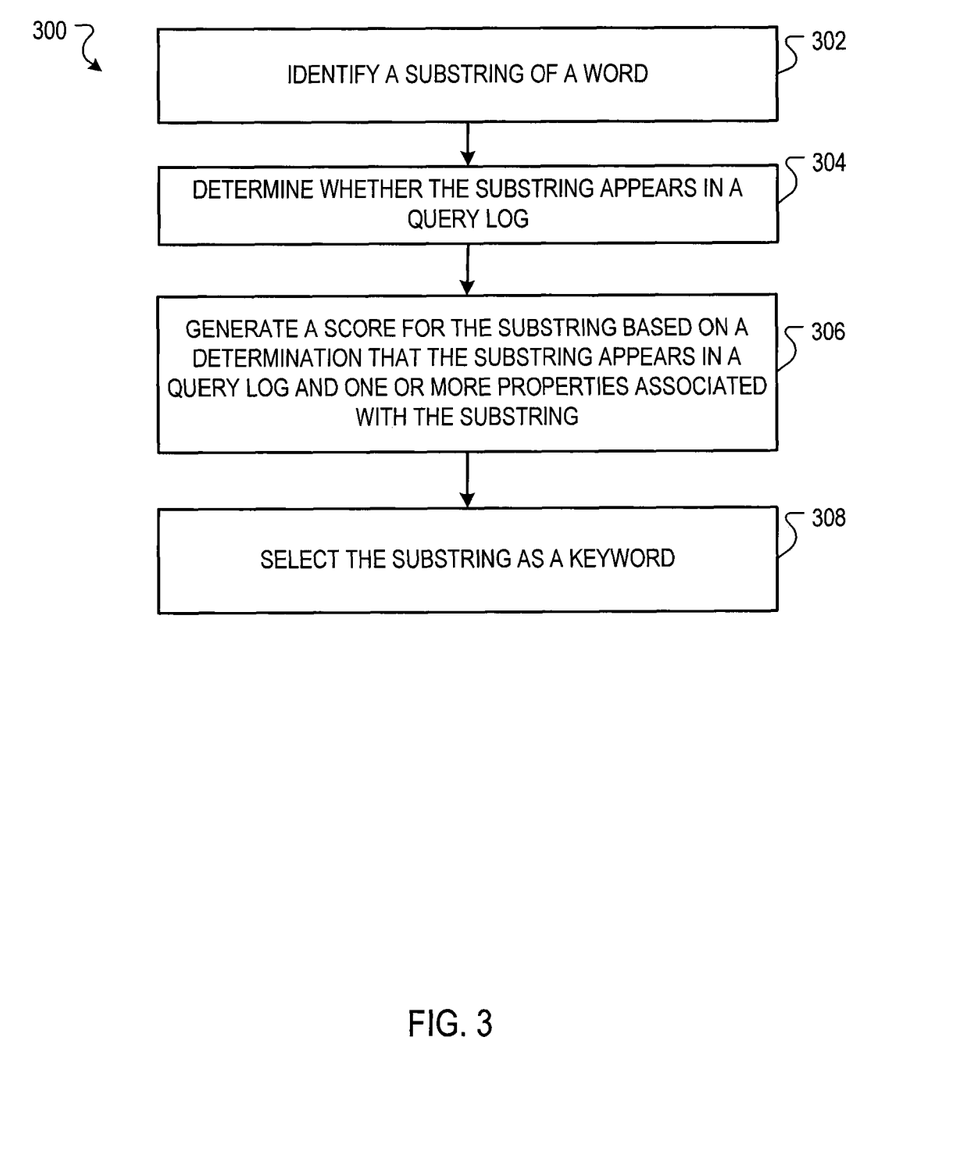
FIG. 3 is flow diagram of an example process for splitting a word.

FIG. 3 is a flow diagram of an example process 300 for splitting a compound word. The process 300 can, for example, be implemented in a system such as the word splitting system 200 of FIG. 2.

Stage 302 identifies a substring of a word. For example, the splitting engine 202 can identify a substring of a word. Stage 304 determines whether the substring appears in a query log. For example, the splitting engine 202 can determine whether the substring appears in a query log. Stage 306 generates a score for the substring based on a determination that the substring appears in a query log and one or more properties associated with the substring. For example, the scoring engine 206 can generate a score for the substring based on a determination that the substring appears in a query log and one or more properties associated with the substring. Stage 308 selects the substring as a keyword. For example, the scoring engine 206 can select the substring as a keyword.

Figure 4:
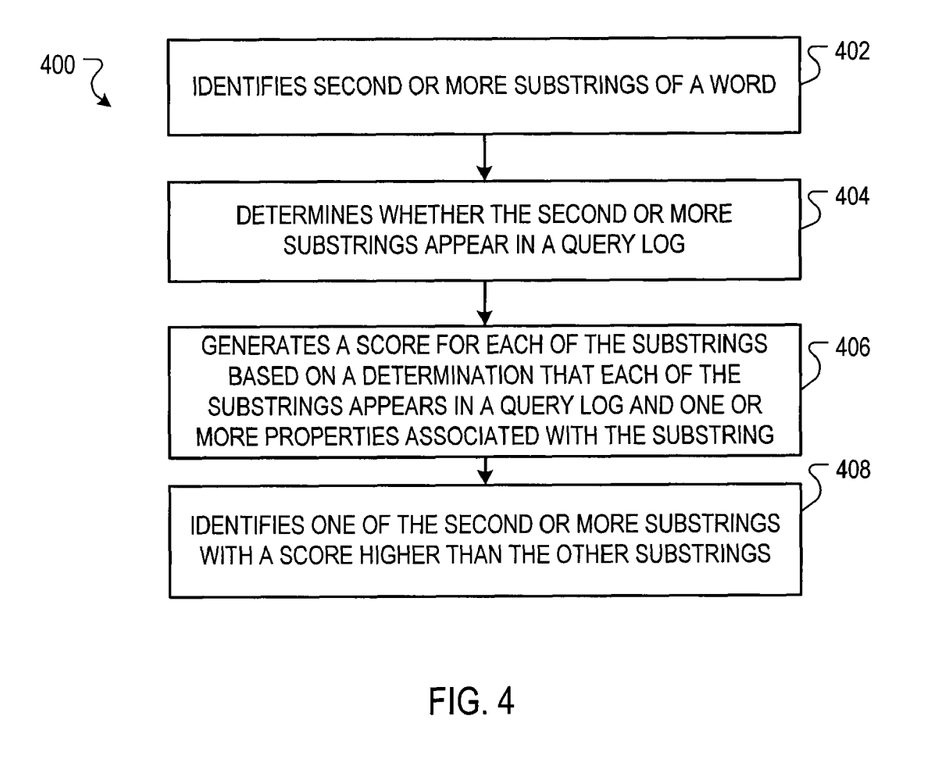
FIG. 4 is a flow diagram of another example process for splitting a word.

FIG. 4 is a flow diagram of another example process 400 for splitting a word. The process 400 can, for example, be implemented in a system such as the word splitting system 200 of FIG. 2. Stage 402 identifies second or more substrings of a word. For example, the splitting engine 402 can identify second or more substrings of a word. Stage 404 determines whether the second or more substrings appear in a query log. For example, the splitting engine 202 can determine whether the second or more substrings appear in a query log. Stage 406 generates a score for each of the substrings based on a determination that each of the substrings appears in a query log and one or more properties associated with the substring. For example, the scoring engine 206 can generate a score for each of the substrings based on a determination that each of the substrings appears in a query log and one or more properties associated with the substring. Stage 408 identifies one of the second or more substrings with a score higher than the other substrings. For example, the scoring engine 206 can identify one of the second or more substrings with a score higher than the other substrings.

Figure 5:
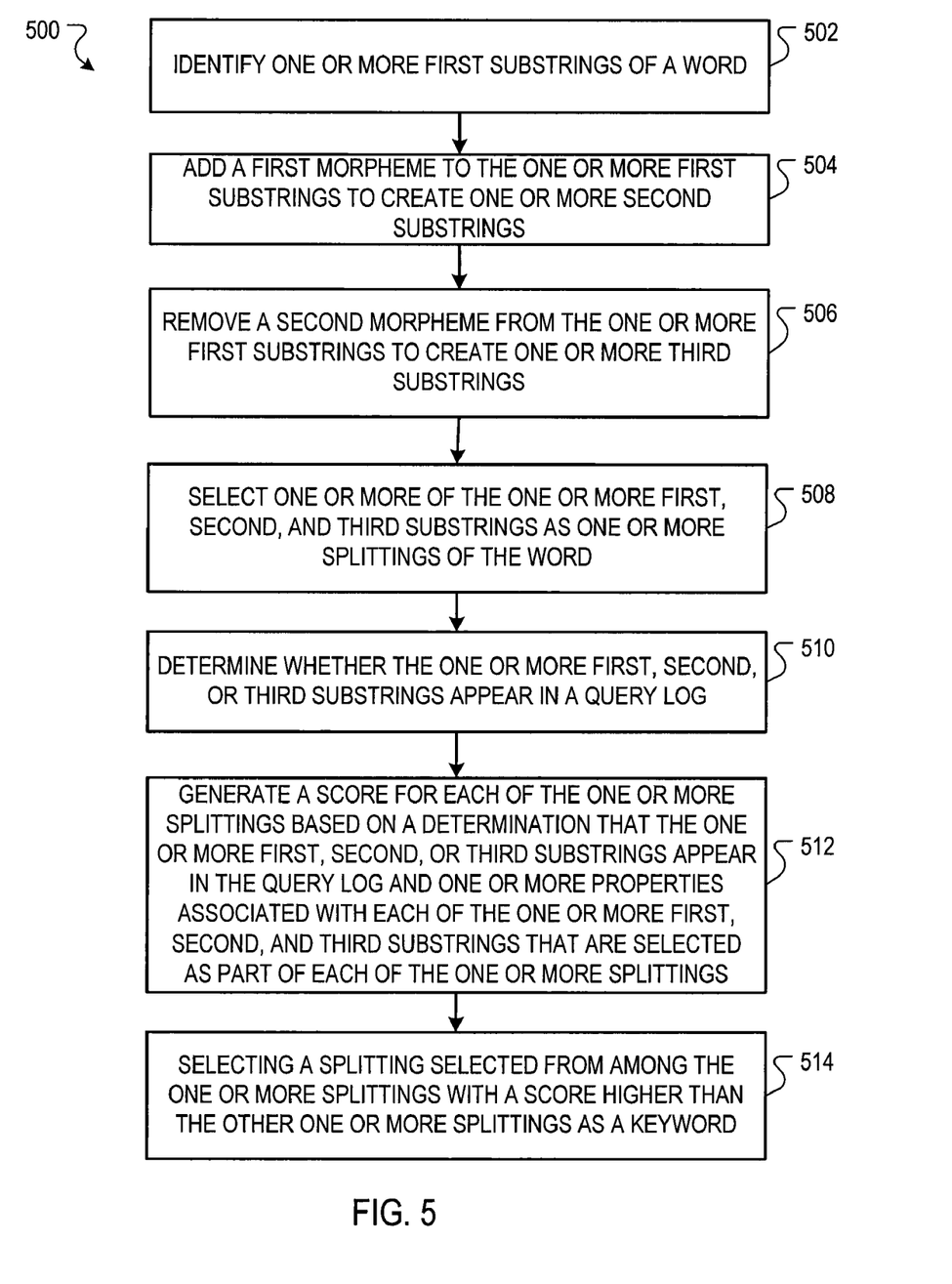
FIG. 5 is a flow diagram of another example process for splitting a word.

FIG. 5 is a flow diagram of another example process 500 for splitting a word. The process 500 can, for example, be implemented in a system such as the word splitting system 200 of FIG. 2. Stage 502 identifies one or more first substrings of a word. For example, the splitting engine 202 can identify one or more first substrings of a word. Stage 504 adds a first morpheme to the one or more first substrings to create one or more second substrings. For example, the splitting engine 202 can add a first morpheme to the one or more first substrings to create one or more second substrings. Stage 506 removes a second morpheme from the one or more first substrings to create one or more third substrings. For example, the splitting engine 202 can remove a second morpheme from the one or more first substrings to create one or more third substrings. Stage 508 can select one or more of the one or more first, second, and third substrings as one or more splittings of the word. For example, the splitting engine 202 can select one or more of the one or more first, second, and third substrings as one or more splittings of the word. Stage 510 determines whether the one or more first, second, or third substrings appear in a query log. For example, the splitting engine 202 can determine whether the one or more first, second, or third substrings appear in a query log.

Stage 512 generates a score for each of the one or more splittings based on a determination that the one or more first, second, or third substrings appear in the query log and one or more properties associated with each of the one or more first, second, and third substrings that are selected as part of each of the one or more splittings. For example, the scoring engine 206 can generate a score for each of the one or more splittings based on a determination that the one or more first, second, or third substrings appear in the query log and one or more properties associated with each of the one or more first, second, and third substrings that are selected as part of each of the one or more splittings. Stage 514 selects a splitting selected from among the one or more splittings with a score higher than the other one or more splittings as a keyword. For example, the scoring engine 206 can select a splitting selected from among the one or more splittings with a score higher than the other one or more splittings as a keyword.

Figure 6:
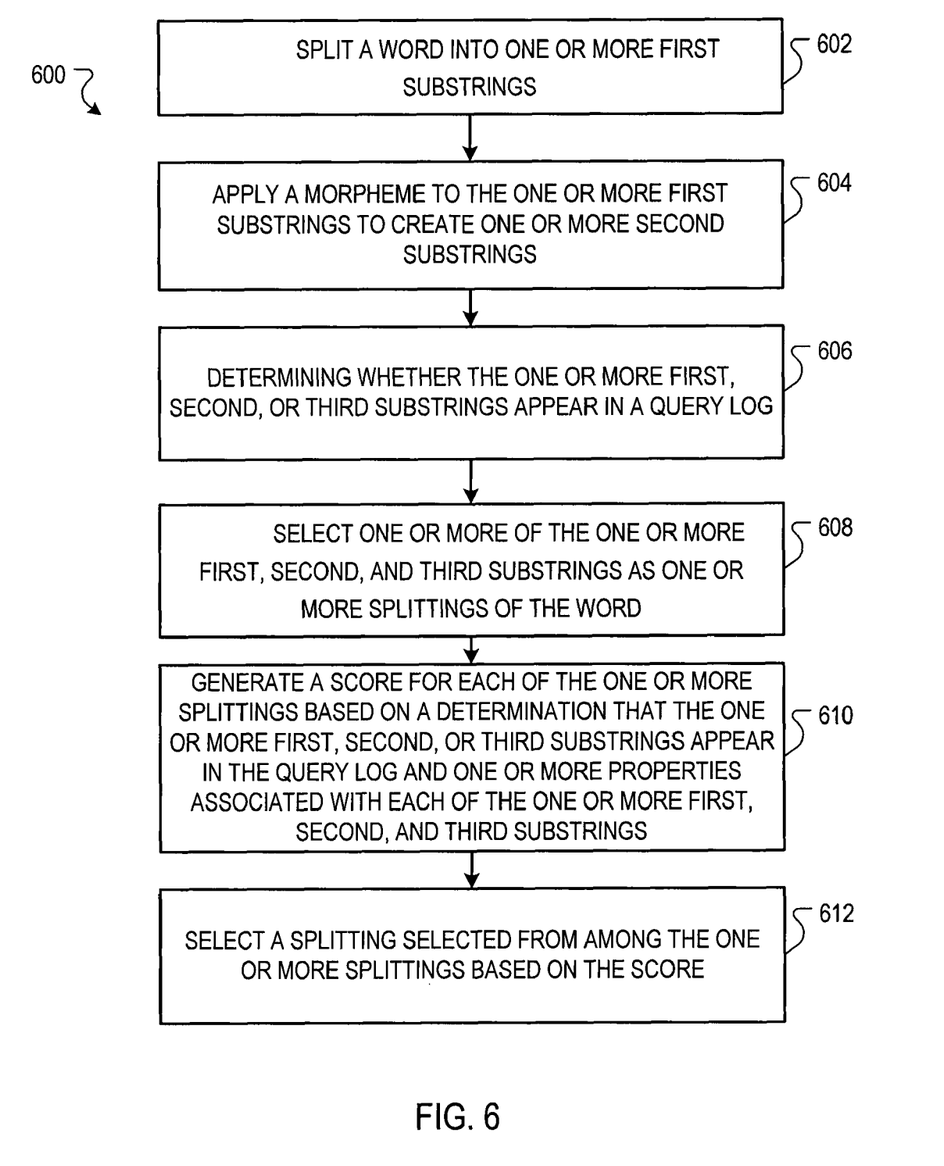
FIG. 6 is a flow diagram of another example process for splitting a word.

FIG. 6 is a flow diagram of another example process 600 for splitting a word. The process 600 can, for example, be implemented in a system such as word splitting system 200 of FIG. 2. Stage 602 splits a word into one or more first substrings. For example, the splitting engine 202 can split a word into one or more first substrings. Stage 604 applies a morpheme to the one or more first substrings to create one or more second substrings. For example, the splitting engine 202 can apply a morpheme with the one or more first substrings to create one or more second and one or more third substrings. Stage 606 determines whether the one or more first, second, or third substrings appear in a query log. For example, the splitting engine 202 can determine whether the one or more first, second, or third substrings appear in a query log.

Stage 608 selects one or more of the one or more first, second, and third substrings as one or more splittings of the word. For example, the splitting engine 202 can select one or more of the one or more first, second, and third substrings as one or more splittings of the word. Stage 610 generates a score for each of the one or more splittings based on a determination that the one or more first, second, or third substrings appear in the query log and one or more properties associated with each of the one or more first, second, and third substrings. For example, the splitting engine 202 can generate a score for each of the one or more splittings based on a determination that the one or more first, second, or third substrings appear in the query log and one or more properties associated with each of the one or more first, second, and third substrings. Stage 612 selects a splitting selected from among the one or more splittings based on the score. For example, the scoring engine 206 can select a splitting selected from among the one or more splittings based on the score.

Figure 7:
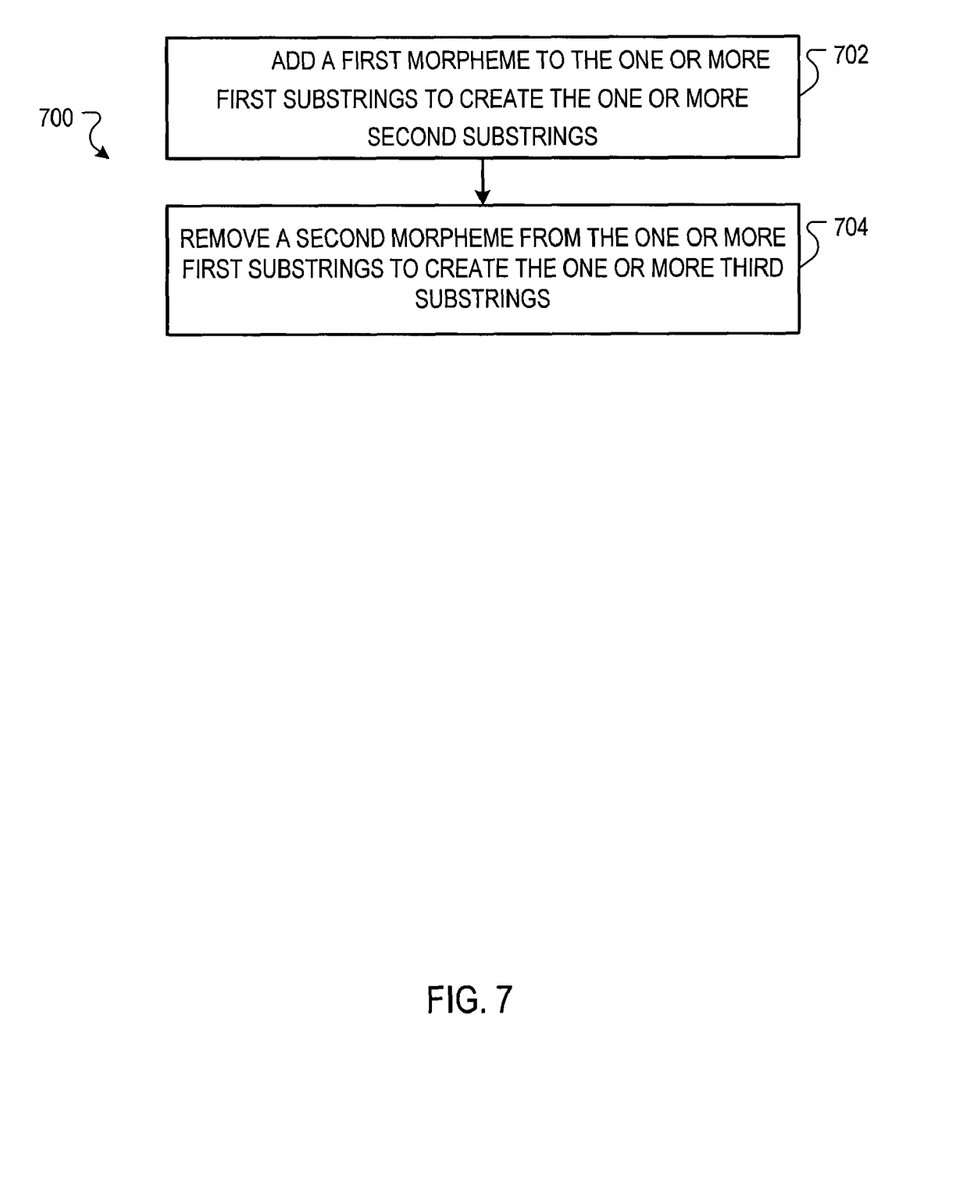
FIG. 7 is a flow diagram of applying a morpheme to one or more first substrings.

FIG. 7 is a flow diagram of an example process 700 for applying a morpheme to one or more first substrings. The process 700 can, for example, be implemented in a system such as the word splitting system 200 of FIG. 2. Stage 702 adds a first morpheme to the one or more first substrings to create the one or more second substrings. For example, the splitting engine 202 can add a first morpheme to the one or more first substrings to create one or more second substrings. Stage 704 removes a second morpheme from the one or more first substrings to create the one or more third substrings. For example, the splitting engine 202 can remove a second morpheme from the one or more first substrings to create one or more third substrings.

Figure 8:
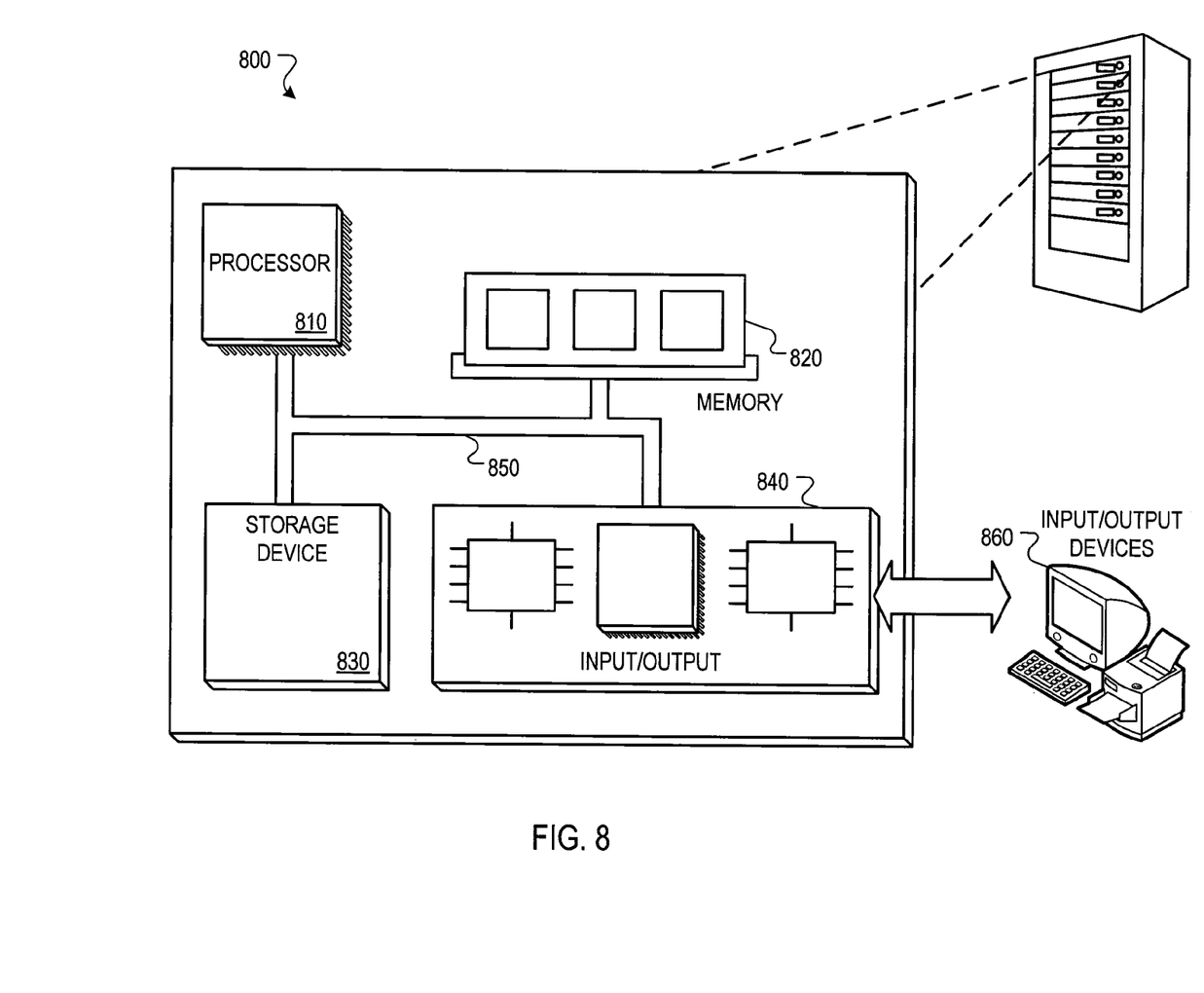
FIG. 8 is a schematic diagram of an example computer system that can be utilized to implement the systems and methods described herein.

FIG. 8 is block diagram of an example computer system 800. The system 800 includes a processor 810, a memory 820, a storage device 830, and an input/output device 840. Each of the components 810, 820, 830, and 840 can, for example, be interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 can, for example, include a hard disk device, an optical disk device, or some other large capacity storage device.

The input/output device 840 provides input/output operations for the system 800. In one implementation, the input/output device 840 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 860. Other implementations, however, can also be used, such as mobile computing devices, mobile communication devices, set-top box television client devices, etc.

Although the above description refers to a content item such as an advertisement, content items such as video and/or audio files, web pages for particular subjects, news articles, etc. can also be used. Also, the implementations can be used with other compound words such as for example, Finnish, as well as other languages that include compound words. Furthermore, while the above description refers to online advertisements, the implementation described can also be used with other possible applications such as, for example, machine translation, speech recognition, information retrieval, etc.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method, comprising:
   identifying a first substring of a word;
   generating a set of one or more alternate substrings comprising:
      adding a morpheme to the first substring to generate an alternate substring;
   determining whether the first substring or alternate substrings appear in a query log;
   generating a score for the each respective substring based on a number of appearances of each respective substring in the query log and one or more properties associated with each respective substring; and
   selecting the first substring or an alternate substring as a keyword based on the score.

2. The method of claim 1, wherein generating the set of one or more alternate substrings further comprises:
   removing a morpheme from the first substring to generate an alternate substring.

3. The method of claim 1, wherein the morpheme is a Germanic language morpheme.

4. The method of claim 1, further comprising:
   using the keyword in a search query to retrieve a content item.

5. The method of claim 1, wherein the one or more properties include at least one of a frequency of each substring, a probability that a substring appears as a query keyword, a co-occurrence frequency of every possible substring pair in a same query; a mutual information of each substring pair, or and the co-occurrence frequency of a word and the one or more substrings of the word.

6. A method, comprising:
   identifying one or more first substrings of a word;
   adding a first morpheme to the one or more first substrings to create one or more second substrings;
   removing a second morpheme from the one or more first substrings to create one or more third substrings;
   selecting one or more of the one or more first, second, and third substrings as one or more splittings of the word;
   determining whether the one or more first, second, or third substrings appear in a query log;
   generating a score for each of the one or more splittings based on a determination that the one or more first, second, or third substrings appear in the query log and one or more properties associated with each of the one or more first, second, and third substrings that are selected as part of each of the one or more splittings; and
   selecting a splitting selected from among the one or more splittings with a score higher than the other one or more splittings as a keyword.

7. The method of claim 6, further comprising:
   retrieving a content item associated with the keyword.

8. The method of claim 7, wherein the content item is an advertisement.

9. The method of claim 6, wherein the first morpheme and the second morpheme are Germanic language morphemes.

10. The method of claim 6, wherein the one or more properties include at least one of a frequency of each substring, a probability that a substring appears as a query keyword, a co-occurrence frequency of every possible substring pair in a same query; a mutual information of each substring pair, or the co-occurrence frequency of a word and the one or more substrings of the word.

11. A method, comprising:
   splitting a word into one or more first substrings;
   generating a set of alternate substrings comprising:
      adding a morpheme to the one or more first substrings to generate one or more alternate substrings;
   determining whether the one or more first substrings or alternate substrings appear in a query log;
   selecting one or more of the one or more first substrings and alternate substrings as one or more splittings of the word;
   generating a score for each of the one or more splittings based on a number of appearances of the one or more first substrings and alternate substrings in the query log and one or more properties associated with each of the one or more first substrings and alternate substrings; and selecting a splitting selected from among the one or more splittings based on the score.

12. The method of claim 11, wherein generating a set of alternate substrings further comprises:

removing a morpheme from the one or more first substrings to generate one or more alternate substrings.

13. The method of claim 11, wherein the score is based on at least one of a frequency of each substring, a probability that a substring appears as a query keyword, a co-occurrence frequency of every possible substring pair in a same query; a mutual information of each substring pair, or the co-occurrence frequency of a word and the one or more substrings of the word.

14. The method of claim 11, further comprising:

using the keyword to retrieve an advertisement.

15. A system, comprising one or more computers, the one or more computers implementing:

a splitting engine that splits a word into one or more first substrings, generates a set of one or more alternate substrings by adding a morpheme to the one or more first substrings, determines whether the one or more first substrings or alternate substrings appear in a query log, and selects one or more of the one or more first substrings and alternate substrings as one or more splittings of the word; and a scoring engine that generates a score for each of the one or more splittings based on a number of appearances of the one or more first substrings or alternate substrings in the query log and one or more properties associated with each of the one or more first substrings or alternate substrings, and selects a splitting selected from among the one or more splittings based on the score.

16. The system of claim 15, wherein the splitting engine:

generates additional alternate substrings by removing morpheme from the one or more first substrings.

17. The system of claim 16, wherein the morpheme is a Germanic language morpheme.

18. The system of claim 15, wherein the one or more properties include at least one of a frequency of each substring, a probability that a substring appears as a query keyword, a co-occurrence frequency of every possible substring pair in a same query; a mutual information of each substring pair, and the co-occurrence frequency of a word and the one or more substrings of the word.

19. The method of claim 15, wherein the keyword is used to retrieve an advertisement.

20. A computer-readable storage device having stored thereon instructions, which, when executed by a computer, cause the computer to perform operations comprising:

identifying a first substring of a word;

generating a set of one or more alternate substrings comprising:

adding a morpheme to the first substring to generate an alternate substring;

determining whether the first substring or alternate substrings appear in a query log;

generating a score for the each respective substring based on a number of appearances of each respective substring in the query log and one or more properties associated with each respective substring; and selecting the first substring or an alternate substring as a keyword based on the score.

21. The storage device of claim 20, wherein generating the set of one or more alternate substrings further comprises:

removing a morpheme from the first substring to generate an alternate substring.

22. The storage device of claim 20, wherein the morpheme is a Germanic language morpheme.

23. The storage device of claim 20, wherein the operations further comprise:

using the keyword in a search query to retrieve a content item.

24. The storage device of claim 20, wherein the one or more properties include at least one of a frequency of each substring, a probability that a substring appears as a query keyword, a co-occurrence frequency of every possible substring pair in a same query; a mutual information of each substring pair, or and the co-occurrence frequency of a word and the one or more substrings of the word.

25. A system comprising:

one or more computers; and a computer-readable storage device having stored thereon instructions that, when executed by the one or more computers, cause the one or more computers to perform operations comprising:

identifying one or more first substrings of a word;

adding a first morpheme to the one or more first substrings to create one or more second substrings;

removing a second morpheme from the one or more first substrings to create one or more third substrings;

selecting one or more of the one or more first, second, and third substrings as one or more splittings of the word;

determining whether the one or more first, second, or third substrings appear in a query log;

generating a score for each of the one or more splittings based on a determination that the one or more first, second, or third substrings appear in the query log and one or more properties associated with each of the one or more first, second, and third substrings that are selected as part of each of the one or more splittings; and selecting a splitting selected from among the one or more splittings with a score higher than the other one or more splittings as a keyword.

26. The system of claim 25, wherein the operations further comprise:

retrieving a content item associated with the keyword.

27. The system of claim 26, wherein the content item is an advertisement.

28. The system of claim 25, wherein the first morpheme and the second morpheme are Germanic language morphemes.

29. The system of claim 25, wherein the one or more properties include at least one of a frequency of each substring, a probability that a substring appears as a query keyword, a co-occurrence frequency of every possible substring pair in a same query; a mutual information of each substring pair, or the co-occurrence frequency of a word and the one or more substrings of the word.

30. A computer-readable storage device having stored thereon instructions, which, when executed by a computer, cause the computer to perform operations comprising:

identifying one or more first substrings of a word;

adding a first morpheme to the one or more first substrings to create one or more second substrings;

removing a second morpheme from the one or more first substrings to create one or more third substrings;

selecting one or more of the one or more first, second, and third substrings as one or more splittings of the word;

determining whether the one or more first, second, or third substrings appear in a query log;

generating a score for each of the one or more splittings based on a determination that the one or more first, second, or third substrings appear in the query log and one or more properties associated with each of the one or more first, second, and third substrings that are selected as part of each of the one or more splittings; and selecting a splitting selected from among the one or more splittings with a score higher than the other one or more splittings as a keyword.

31. The storage device of claim 30, wherein the operations further comprise:

retrieving a content item associated with the keyword.

32. The storage device of claim 31, wherein the content item is an advertisement.

33. The storage device of claim 30, wherein the first morpheme and the second morpheme are Germanic language morphemes.

34. The storage device of claim 30, wherein the one or more properties include at least one of a frequency of each substring, a probability that a substring appears as a query keyword, a co-occurrence frequency of every possible substring pair in a same query; a mutual information of each substring pair, or the co-occurrence frequency of a word and the one or more substrings of the word.

35. A system comprising:

one or more computers; and a computer-readable storage device having stored thereon instructions that, when executed by the one or more computers, cause the one or more computers to perform operations comprising:

splitting a word into one or more first substrings;

generating a set of alternate substrings comprising:

adding a morpheme to the one or more first substrings to generate one or more alternate substrings;

determining whether the one or more first substrings or alternate substrings appear in a query log;

selecting one or more of the one or more first substrings and alternate substrings as one or more splittings of the word;

generating a score for each of the one or more splittings based on a number of appearances of the one or more first substrings and alternate substrings in the query log and one or more properties associated with each of the one or more first substrings and alternate substrings; and selecting a splitting selected from among the one or more splittings based on the score.

36. The system of claim 35, wherein generating a set of alternate substrings further comprises:

removing a morpheme from the one or more first substrings to generate one or more alternate substrings.

37. The system of claim 35, wherein the score is based on at least one of a frequency of each substring, a probability that a substring appears as a query keyword, a co-occurrence frequency of every possible substring pair in a same query; a mutual information of each substring pair, or the co-occurrence frequency of a word and the one or more substrings of the word.

38. The system of claim 35, wherein the operations further comprise:

using the keyword to retrieve an advertisement.

39. A computer-readable storage device having stored thereon instructions, which, when executed by a computer, cause the computer to perform operations comprising:

splitting a word into one or more first substrings;

generating a set of alternate substrings comprising:

adding a morpheme to the one or more first substrings to generate one or more alternate substrings;

determining whether the one or more first substrings or alternate substrings appear in a query log;

selecting one or more of the one or more first substrings and alternate substrings as one or more splittings of the word;

generating a score for each of the one or more splittings based on a number of appearances of the one or more first substrings and alternate substrings in the query log and one or more properties associated with each of the one or more first substrings and alternate substrings; and selecting a splitting selected from among the one or more splittings based on the score.

40. The storage device of claim 39, wherein generating a set of alternate substrings further comprises:

removing a morpheme from the one or more first substrings to generate one or more alternate substrings.

41. The storage device of claim 39, wherein the score is based on at least one of a frequency of each substring, a probability that a substring appears as a query keyword, a co-occurrence frequency of every possible substring pair in a same query; a mutual information of each substring pair, or the co-occurrence frequency of a word and the one or more substrings of the word.

42. The storage device of claim 39, wherein the operations further comprise:

using the keyword to retrieve an advertisement.

* * * * *

UNITED STATES PATENT AND TRADEMARK OFFICE
CERTIFICATE OF CORRECTION

| | | |
|---|---|---|
| PATENT NO. | : 8,046,355 B2 | Page 1 of 1 |
| APPLICATION NO. | : 11/849728 | |
| DATED | : October 25, 2011 | |
| INVENTOR(S) | : Enrique Alfonseca and Stefan H. Pharies | |

It is certified that error appears in the above-identified patent and that said Letters Patent is hereby corrected as shown below:

First Page, Col. 2 (Other Publications), Line 7; replace:
"Trarnslation, Relevance Feedback and Decompounding, Information" with
-- Translation, Relevance Feedback and Decompounding, Information --

Column 14, Line 21 at Claim 6; replace:
"and the co-occurrence frequency of a word and the one or" with
-- the co-occurrence frequency of a word and the one or --

Column 15, Line 37 at Claim 17; replace:
"generates additional alternate substrings by removing mor-" with
-- generates additional alternate substrings by removing a mor- --

Column 15, Line 48 at Claim 20; replace:
"The method of claim 15, wherein the keyword is used to" with
-- The system of claim 15, wherein the keyword is used to --

Signed and Sealed this
Thirty-first Day of January, 2012

David J. Kappos
*Director of the United States Patent and Trademark Office*